(12) United States Patent
Kline et al.

(10) Patent No.: US 6,220,518 B1
(45) Date of Patent: Apr. 24, 2001

(54) PROCESS AND APPARATUS FOR INDIVIDUAL ADJUSTMENT OF THE TEMPERATURE SET POINTS OF A PLURALITY OF VAV DEVICES

(75) Inventors: James R. Kline, Moraga; Matthew L. Costick, Pleasanton, both of CA (US)

(73) Assignee: Acutherm L.P., Hayward, CA (US)

( * ) Notice: Subject to any disclaimer, the term of this patent is extended or adjusted under 35 U.S.C. 154(b) by 0 days.

(21) Appl. No.: 09/311,379

(22) Filed: May 13, 1999

(51) Int. Cl.[7] .............................. F24F 7/00; G05D 23/00
(52) U.S. Cl. ........................... 236/49.3; 236/51; 165/217
(58) Field of Search .................... 236/49.3, 51; 165/205, 165/209, 217

(56) References Cited

U.S. PATENT DOCUMENTS

| Re. 30,953 | 6/1982 | Vance et al. ........................ 236/49.3 |
| 4,491,270 | 1/1985 | Brand ................................. 236/49.5 |
| 4,509,678 | 4/1985 | Noll .................................. 236/49.5 |
| 4,515,069 | 5/1985 | Kline et al. ........................ 236/48 R |
| 4,523,713 | 6/1985 | Kline et al. ........................ 236/1 C |
| 4,537,347 | 8/1985 | Noll et al. ......................... 236/49.5 |
| 4,821,955 | 4/1989 | Kline et al. ....................... 236/49.3 |
| 4,860,950 * | 8/1989 | Reeser et al. ...................... 236/51 |
| 4,890,666 * | 1/1990 | Clark ................................ 236/49.3 X |
| 4,969,508 * | 11/1990 | Tate et al. ........................ 236/51 X |
| 5,927,398 * | 7/1999 | Maciulewicz ...................... 236/51 X |

* cited by examiner

Primary Examiner—William Wayner
(74) Attorney, Agent, or Firm—Flehr Hohbach Test Albritton & Herbert LLP

(57) ABSTRACT

An apparatus and process for individual adjustment of the temperature set points of a plurality of VAV devices (27, 29) in an HVAC system. The process includes the step of coupling each of a plurality of computers (34) located in a plurality of offices or spaces (22) for input of a temperature set point signal. The computers (34) are coupled to the VAV devices (27, 29) such that a selected computer will input or adjust the temperature set point of only VAV devices (27, 29) located in the same space (22) as the computer (34). Such coupling can be accomplished through direct electrical connections (33), transmitted signals (37, 38), or the use of computer networks (36, 42) which are connected to the VAV devices (27, 29) directly or through the building HVAC control network (32). In the preferred form, the computers (34) are also capable of retrieving the current set point from the VAV device (27, 29), displaying it on the computer display screen and thereafter adjusting the temperature, for example, by using graphical display software.

18 Claims, 2 Drawing Sheets

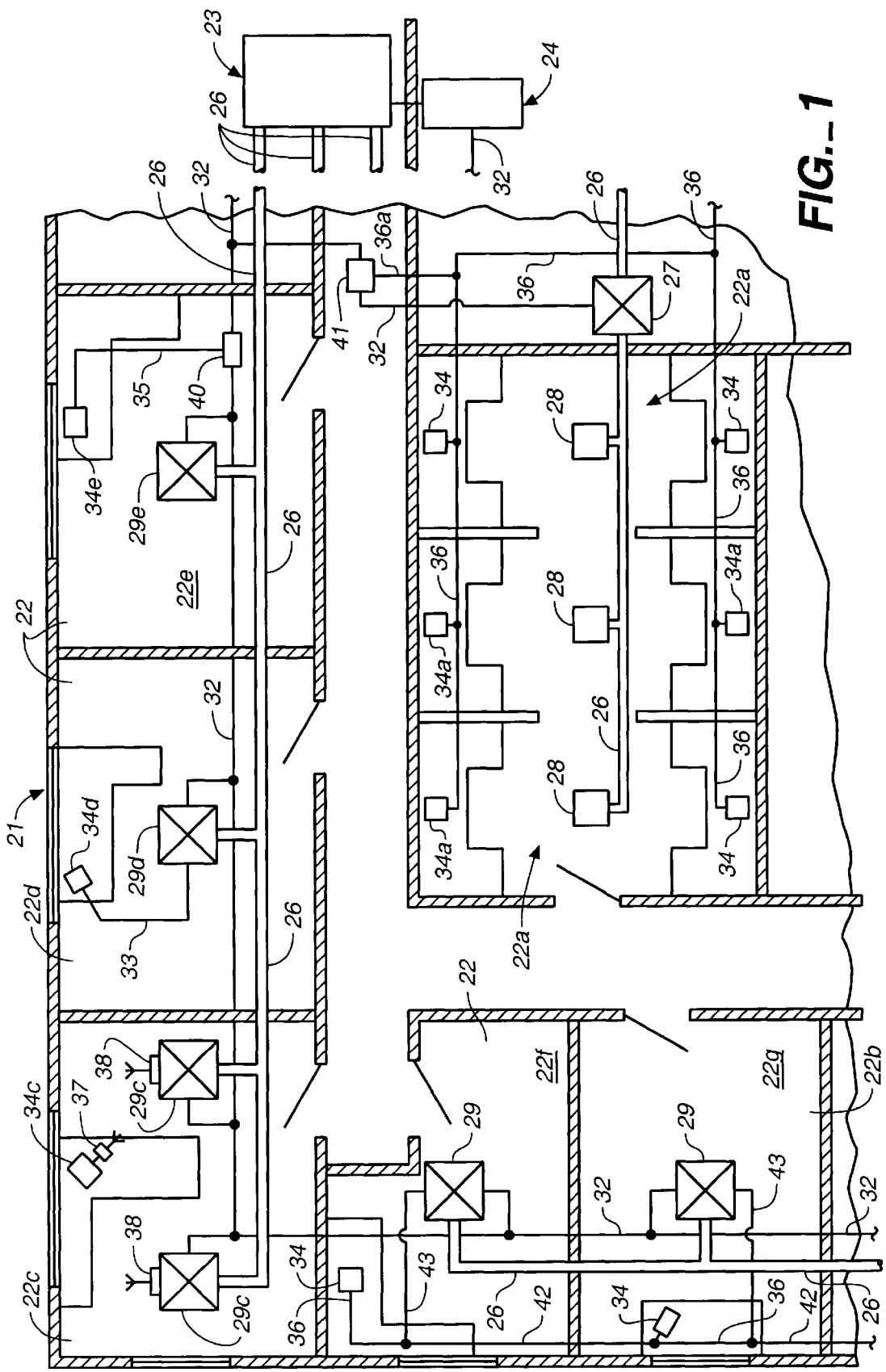
FIG._1

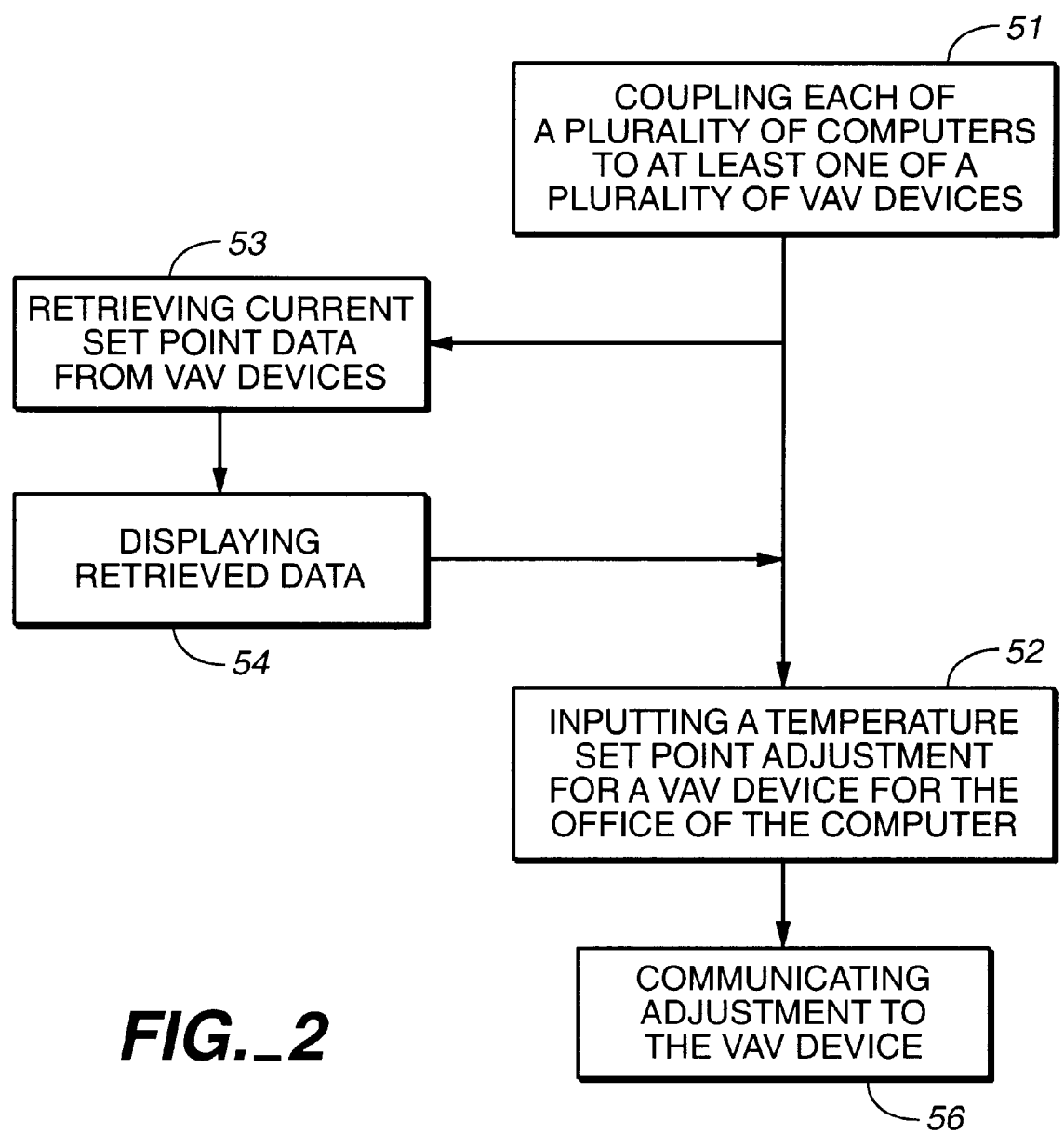
FIG._2

PROCESS AND APPARATUS FOR INDIVIDUAL ADJUSTMENT OF THE TEMPERATURE SET POINTS OF A PLURALITY OF VAV DEVICES

TECHNICAL FIELD

The present invention relates, in general, to heating, ventilating and air conditioning (HVAC) systems, and more particularly to HVAC systems having variable-air-volume (VAV) diffusers or VAV boxes with adjustable temperature set point controllers.

BACKGROUND ART

The use of variable air volume (VAV) devices in order to control the temperature and/or ventilation in large buildings is wide spread. Such HVAC systems typically have at least one, and sometimes a plurality of VAV devices located in the various spaces, rooms or offices within the building for control of the discharge of conditioned air into the offices. The air typically will be provided by a central source, and the volume air discharged into each office within the building will be varied in accordance with the control mechanism for the VAV device. Such VAV devices typically have a damper or set of blades, which is moved by an actuator so as to change the area of the opening from which conditioned air is discharged from the VAV device. VAV boxes most typically are positioned upstream of a plurality of passive (damperless) air diffusers, while VAV diffusers include actuators and dampers at the structure discharging air into the space or office.

The control assembly for a VAV device will have one or more temperature set points which are used as a basis for regulating opening and closing of the damper by the actuator so as to drive the room temperature toward the set point. One set point may be used, for example, when the system is in a heating mode, while another may be used for a cooling mode. In some systems, however, the same temperature set point is used for heating and cooling.

In large office buildings, the HVAC system will be coupled to a plurality of thermostats located in the various offices or to a central building HVAC computer for monitoring and adjusting the set points for the VAV devices. In multiple thermostat systems, wiring must be run between individual VAV devices and the thermostats. In central computer systems, the computer is coupled through an HVAC building computer network that is coupled to the VAV devices. The central building control computer, therefore, can be used to monitor and adjust the set point temperatures of the various actuators in the VAV devices for individual offices.

One of the major disadvantages of thermostat-based systems is the wiring required during installation, which can be tricky in open office environments having free-standing work stations and space-dividing partition systems. A major disadvantage of building-wide HVAC computer monitoring systems is that the temperature set point adjustments must be made from a central monitoring station. Thus, the occupants of the individual offices in the building are not able to provide direct input as to the desired temperature set point for the VAV device effecting their office. Instead, occupants typically communicate with the building central monitoring and adjustment computer by telephone so as to make their wishes known with respect to environmental demands in their office.

It would be highly desirable, therefore, to have an HVAC system suitable for large buildings in which the individual VAV devices are capable of having their temperature set point independently directly adjusted by occupants of the offices through a method other than using wall-mounted thermostats. Thus, the occupants, who know best what environmental conditions are most suited for their office at a given time, would like to have a way of adjusting the HVAC system for their space without having to communicate with, or go through, a central monitoring computer, and without having to go to a wall-mounted thermostat.

Accordingly, it is an object of the present invention to provide a process and apparatus for individual adjustment of the temperature set points of a VAV device located in an occupant's office without affecting other offices and without using a thermostat or having to communicate with a central computer.

It is a further object of the present invention to provide a means for the occupant of a space in the building to easily adjust the temperature set points of the VAV device discharging air into his or her space using equipment commonly available in an office environment.

It is still a further object of the present invention to provide a VAV device adjustment system which is easy to install, is user-friendly, is relatively low in cost and provides a wide range of user flexibility.

The process and apparatus of the present invention have other objects and features of advantage which will become more apparent from, and are set forth in more detail in, the following Description of the Best Mode of Carrying Out the Invention and the accompanying drawings.

DISCLOSURE OF THE INVENTION

A process for individual adjustment of the temperature set point of a plurality of VAV boxes in an HVAC system for a building is provided, which is comprised, briefly, of coupling a plurality of computers located in a plurality of spaces or offices in the building for input of a temperature set point signal to the VAV device located for the discharge of air into each space in which the computer is located, each VAV device being responsive to the signal to adjust a temperature set point for the device; inputting a temperature set point to a selected computer for adjustment of the VAV device located in the same space; and communicating a temperature set point signal from this selected computer to the VAV device to effect adjustment of the temperature set point independently of other VAV devices in the HVAC system.

The HVAC system of the present invention comprises, briefly, a plurality of VAV devices each adapted for receipt of a signal to adjust a temperature set point for operation of the VAV device, at least one of the VAV devices being located in each of a plurality of spaces in a building, and a plurality of computers each adapted to produce signals suitable for adjusting the temperature set point of a VAV device and being located in a plurality of spaces having a VAV device therein, the plurality of computers each further being coupled and adapted for the transmission of a signal to the VAV device located in the same space so as to adjust the temperature set point of the VAV device.

In the most preferred form, a desktop, laptop or other multipurpose computer of the type commonly employed in business, government and educational applications is coupled through a computer network, directly or indirectly, to the VAV devices and provided with a software program which will send encoded signals to the VAV device so as to retrieve the current temperature set point conditions and enable their adjustment.

BRIEF DESCRIPTION OF THE DRAWING

FIG. 1 is a fragmentary, schematic, top plan view of a typical building installation having an HVAC system with a plurality of VAV devices monitored and adjusted in accordance with the present invention.

FIG. 2 is a schematic flow diagram of the VAV device temperature set point process of the present invention.

BEST MODE OF CARRYING OUT THE INVENTION

In recent years the multipurpose business or personal computer has become omnipresent in modern office buildings. Such computers may take the form of desktop, laptop or even hand-held devices, and they may be stand-alone or coupled to local area, or wide area, network. Nevertheless, personal computers are now widely available in most office building environments, and in accordance with the present invention, such computers may be adapted for use in individually adjusting an operating parameter of a VAV device, such as the temperature set point. Thus a personal computer located in the same office or space in which the VAV device is controlling the environmental conditions can be used in the apparatus and method of the present invention to monitor and adjust the temperature set point(s) of the VAV device.

Referring now to FIG. 1, a typical HVAC system installation for an office building is schematically illustrated. Building 21 has a plurality of offices, rooms or spaces 22 that are air conditioned using a plurality of VAV devices supplied with conditioned air from a central source 23. The operation of the VAV devices can be monitored and adjusted by a central computer at monitoring station 24. Ducts 26 for the flow of air from central air conditioning source 23 to the VAV devices are provided. Alternatively, building 21 could be initially provided with a plurality of wall-mounted thermostats (not shown) which are wired to the various VAV devices.

VAV devices usually take one of two forms, namely, an air diffuser which has an actuator and movable damper assembly in it (graphically symbolized by a square with diagonal crossed lines), or a VAV box (also a square with a cross) upstream of passive diffusers (squares only) which discharge air into spaces 22. The large office or space 22a, for example, includes a VAV box 27 employed to vary air flow to a plurality of passive air diffusers 28. In smaller spaces, such as space 22b, the VAV diffusers 29 will more typically be employed.

Although VAV devices 27 and 29 are not always linked together for monitoring by a central computer system (e.g., when a thermostat system is used), in the illustrated HVAC system, central computer 24 is attached to an HVAC building system computer network 32, which in turn, is coupled to each of the VAV devices 27 and 29. Each of the VAV devices 27 and 29 includes a control assembly in which there is an actuator and interface so that signals received from central computer 24 through network 32 can be used to adjust the set point(s) temperatures about which a given VAV device operates. Each VAV device may be thermally powered, pneumatically powered or electrically powered and typically will have one or more temperature set points governing its operation. One temperature set point, for example, might be used when the central source of conditioned air 23 is in a heating mode, while another temperature set point at each VAV device might be employed when source 23 is in a cooling mode.

Such HVAC systems using VAV devices are well-known in the art, and they allow central computer 24 to monitor the current temperature set points of each of the VAV devices, as well as send encoded signals along the HVAC computer network 32 to individual VAV devices so as to adjust or change the temperature set points, and thus operation of the system, on a space-by-space basis.

The primary drawback of such central computer systems has been that occupants in any one of offices or spaces 22 either have little ability to adjust the operation of the VAV devices in their office, or they must do so through cumbersome techniques, such as telephoning an operator or computer at the central computer 24. In thermostat-based systems, the occupant must get up from his or her desk and go to the wall thermostat, and such thermostat-based systems also have initial installation disadvantages in terms of wiring costs.

The present invention utilizes the fact that computer hardware is in wide-spread use in office buildings of the type which are air conditioned using VAV devices. Thus, as shown in FIG. 1 offices 22 will usually have one or more personal computers 34 located in them. In some offices, such as office 22c, computer 34 will be a stand-alone computer, while in others, for example office 22a, computers 34 will be coupled together by a local area network 36. In conventional configurations neither the stand-alone computers nor those coupled together through a local area network will interact or be coupled in any manner to building HVAC computer network 32, nor to any of the VAV devices. Building computer network 32 is operated totally independently of computers 34 in use by the building occupants.

In the process and apparatus of the present invention, however, a plurality of multipurpose business computers 34 located in a plurality of offices or spaces 22 in building 21 are coupled for input of temperature set point signals to at least one VAV device located for discharge of air into the same office or space in which computer 34 is located. Thus, computer 34d in space 22d is coupled for the input of temperature set point signals to VAV device 29d, while computer 34e is coupled to input signals to VAV device 29e in space 22e.

As can be seen for space 22a, VAV box 27 is typically located outside space 22a, but computers 34a in space 22a are coupled to VAV box 27 to enable monitoring and adjustment of the set point temperatures for VAV device 27 so as to vary the discharge of air from passive diffusers 28 in space 22a. As used herein, therefore, computers are coupled to the VAV device "located for the discharge of air" into the same space or office as the computer, even though the VAV device may be located in a space outside that in which the computer is located.

The coupling of computers in spaces 22 to their respective VAV devices can be accomplished in several different manners. One approach is illustrated in office 22c in which a transmitter, or preferably transceiver, graphically shown at 37, at computer 34c communicates with receivers, or preferably transceivers, 38 at one or more VAV devices. In office 22c, two VAV devices 29c are provided with transceivers 38 which can communicate with the transceiver 37 at computer 34c. The same signal when transmitted from computer 34c will be capable of adjusting the set point temperature of each of the VAV devices 29c. Computer 34c will include a program which causes the transceiver 37 to broadcast signals to the two VAV devices. The VAV devices, in turn, have an interface between transceivers 38 and the controller for the diffuser actuator so that adjustment of the set point for the controller in each of the VAV devices can be accomplished. Such interface and diffuser controller technology is well-known in the art. The computer 34c, however, normally will not be capable of transmitting a signal which would effect a change in the temperature set point of VAV device 29d. This can be accomplished easily by using encoded transmissions or limiting the power of the transmitter or crippling (limiting) the sensitivity of transceivers 38.

In the most preferred form, transceivers 37 and 38 are radio frequency transceivers, but it will be understood, optical or other forms of transceivers also could be employed.

An alternative manner of coupling computers 34 to VAV device 27 and 29 would be simply to provide an electrical signal communication wire, link or cable. Thus, in office 22d, a stand-alone computer 34d is coupled directly to VAV device 29d by a cable 33 for the communication of signals to the controller of VAV device 29d. Still a further approach is shown in connection with the computer 34e in space 22e. Computer 34e is coupled by cable 35 to a router box 40 which, in turn, enables encoded signals to be sent through cable 35 and router 40 and thereafter over building HVAC network 32 to VAV device 29e. When this type of coupling technique is employed, computer 34e should include software, or another adaptation, which causes the output signal from computer 34e to be capable of adjusting only the set point of VAV device 29e. An encoded output signal, for example, would suffice.

Local area network 36 for computer 34a also can be coupled by cable 36a to a router 41 inserted in building management HVAC network 32. Coded signals generated by input at any of computers 34a, therefore, would travel through local area network 36, link 36a, router 41 and building HVAC network 32 to VAV device 27.

Still a further coupling technique is shown in connection with offices 22f and 22g. Computers 34 are connected to a local area network 42, which can then be directly coupled at 43 to diffusers 29. This approach does not require connection to building HVAC network 32, but it does require encoded signals or the like so that the computer in space 29f does not adjust operation of the VAV device in space 22g. It would be possible, of course, to link local area network 42 to building network 32, which usually would be preferred since less wiring would be required than employing a plurality of cable links 43.

In the preferred form, all computers 34 would enable communications in both directions so that the occupant in a space 22 can poll the VAV device 27 and 29 to determine what its current temperature set points are and thereafter send a signal back to the VAV device changing the same.

Thus, unlike the approach used for central building computer 24, in the present invention a plurality of computers are positioned in a plurality of spaces in the building and coupled to VAV devices so that they are able to adjust, and preferably monitor, the temperature set point in the VAV device which discharges air into the same space as the computer is located. This allows the occupant of an office to be able to make an adjustment of only the VAV device which affects his or her environment without even leaving his or her desk or work station. The only requirement is coupling of the occupant's computer to the VAV device, which can be accomplished through transmitters and receivers, direct electrical connection to the VAV device or the building HVAC network, coupling a local area network directly to the VAV device, or coupling a local area network to the building HVAC control network.

Referring now to FIG. 2, the process for independent adjustment of temperature set points of a plurality of VAV devices in an HVAC system can be described. The first step 51 of the process is to couple each of a plurality of computers to at least one of a plurality of VAV devices. Each computer is formed or adapted to produce signals suitable for adjustment of a temperature set point of a VAV device to which it is coupled. Most typically this will be accomplished by providing each computer with a VAV temperature set point adjustment software program that can generate an encoded output signal suitable for transmission directly to the VAV device or communication on a cable or network or a plurality of networks to the VAV device.

It should be noted that in a given building 21 having a plurality of offices 22, not all of the offices need to have VAV devices which are individually adjusted using individual computers. Thus, a plurality of spaces 22, perhaps less than the entire building, may be individually adjustable by occupant computers, while another set of spaces or offices are not so coupled.

The second step 52 in the present process is to input into a selected computer a temperature set point adjustment for the VAV device discharging air into the space in which the computer is located. Thus, in the broadest form of the process each computer would merely be capable of inputting temperature set points, for example, through a keyboard or through a graphical interface displayed at the computer and manipulated using a mouse. The graphical display, for example, can simply be a thermometer in which the curser driven by the mouse is used to adjust a temperature symbol on a screen to change the temperature set point.

While the broadest form of the process merely requires inputting, it is most preferable that the individual computers 34 further be adapted to retrieve temperature set point data from VAV devices 27 and 29. Thus, an optional step 53, prior to inputting step 52, would be to retrieve the current temperature set point from the VAV device by polling the controller of the VAV device to determine its current temperature set point setting. Once this information is retrieved, an additional optional step 54 in the present process would be to display the retrieved current setting, either as a numeric display or a graphic display.

Having retrieved the current temperature set point setting and displayed it, the present process would then proceed with user inputting 52 for adjustment of the temperature set point for the VAV device discharging air into the space having the computer. Finally, the software in computer 34 communicates at step 56 the new temperature set point to the VAV device 27 or 29 in the form of a signal, usually encoded, to the VAV device.

The present apparatus and process, therefore, allow the individual occupants of offices to monitor and adjust their environment at their work stations using conventionally available equipment, the multipurpose business or personal computer. A rather simple temperature set point program can be provided for the multipurpose computer employed, and the computer can be coupled easily to the VAV device. The VAV device must further be capable of having its temperature set point adjusted through the receipt of input signals to the VAV controller.

One example of a VAV device suitable for adjustment by a multipurpose personal or business computer is the device described in detail in commonly owned, co-pending, patent application Ser. No. 09/218,370, entitled VARIABLE-AIR-VOLUME DIFFUSER ACTUATOR ASSEMBLY AND METHOD. In this VAV device, thermal actuators are electrically controlled, preferably using a resistance heater. Other VAV devices, including pneumatically controlled and motor-driven diffusers and VAV boxes also are suitable for use in the system of the present invention.

What is claimed is:

1. A process for individual adjustment of the temperature set points of a plurality of VAV devices in an HVAC system for a building, comprising the steps of:
   coupling each of a plurality of multipurpose computers located in a plurality of spaces in said building for input of a temperature set point signal to at least one VAV device located for the discharge of air into each of said spaces, each said VAV device being adapted for, and responsive to, receipt of said signal to make a lasting adjustment of a temperature set point for said VAV device;
   inputting a selected computer with a temperature set point for adjustment of the temperature set point of a VAV device located in the same space as said selected computer; and
   communicating a temperature set point signal from said selected computer to the VAV device located in said same space to effect adjustment of the temperature set point for said VAV device independently of other VAV devices in said HVAC system.

2. The process as defined in claim 1 wherein, said coupling step is accomplished by coupling said plurality of computers to VAV diffusers.

3. The process as defined in claim 1 wherein, said plurality of coupling step is accomplished by coupling said plurality of computers to VAV boxes.

4. The process as defined in claim 1 wherein, said coupling step is accomplished by coupling one of a desktop, a laptop and a hand-held computer to a VAV device.

5. The process as defined in claim 1 wherein, said coupling step is accomplished by coupling said computer to said VAV device using a transmitter connected to said computer and a receiver connected to said VAV device.

6. An HVAC system comprising:
   a plurality of VAV devices each adapted for, and responsive to, receipt of a signal to adjust a temperature set point for operation of said VAV devices, at least one of said VAV devices being located in each of a plurality of spaces in a building; and
   a plurality of multipurpose computers each adapted to produce signals suitable for adjusting the temperature set point of a VAV device and being located in at least a plurality of said spaces having a VAV device therein, said plurality of computers each further being coupled and adapted for the transmission of said signal to a VAV device located in the same space as said computer so as to enable adjustment of the temperature set point.

7. The HVAC system as defined in claim 6 wherein, said VAV devices are provided by at least one of a VAV diffuser and a VAV box.

8. The HVAC system as defined in claim 7 wherein, said computers are provided by at least one of a desktop computer, a laptop computer and a hand-held computer.

9. The HVAC system as defined in claim 6 wherein, said computers are coupled to said VAV devices by electrical connections.

10. The HVAC system as defined in claim 6 wherein, said computers include programs formed to retrieve information from said VAV devices as to the current set point temperature of said VAV devices.

11. A process for individual adjustment of the temperature set points of a plurality of VAV devices in an HVAC system for a building comprising the steps of:
    coupling each of a plurality of computers located in a plurality of spaces in said building for input of temperature set point signals to a local area network coupled to each of said VAV devices for communication of said temperature set point signals to said VAV devices, each said VAV device being adapted for, and responsive to, receipt of said signal to adjust a temperature set point for said VAV device;
    inputting a selected computer with a temperature set point for adjustment of the temperature set point of a VAV device located in the same space as said selected computer; and
    communicating a temperature set point signal encoded to effect adjustment of only a VAV device located in the same space as the selected computer from said selected computer through the local area network to the VAV device located in said same space to effect adjustment of the temperature set point for said VAV device independently of other VAV devices in said HVAC system.

12. The process as defined in claim 11 wherein, said local area network is coupled to said VAV devices through a building HVAC computer network.

13. A process for individual adjustment of the temperature set points of a plurality of VAV devices in an HVAC system for a building comprising the steps of:
    coupling each of a plurality of computers located in a plurality of spaces in said building for input of a temperature set point signal to at least one VAV device located for the discharge of air into each of said spaces, each said VAV device being adapted for, and responsive to, receipt of said signal to adjust a temperature set point for said VAV device;
    retrieving a current temperature set point from said VAV device;
    displaying said current temperature set point at a display terminal for said terminal;
    inputting a selected computer with a temperature set point for adjustment of the temperature set point of a VAV device located in the same space as said selected computer; and
    communicating a temperature set point signal from said selected computer to the VAV device located in said same space to effect adjustment of the temperature set point for said VAV device independently of other VAV devices in said HVAC system.

14. The process as defined in claim 13, and prior to said inputting step, using a graphical interface to select a new temperature set point input.

15. An HVAC system comprising:
    a plurality of VAV devices each adapted for, and responsive to, receipt of a signal to adjust a temperature set point for operation of said VAV devices, at least one of said VAV devices being located in each of a plurality of spaces in a building; and
    a plurality of computers each adapted to produce signals suitable for adjusting the temperature set point of a VAV device and being located in at least a plurality of said spaces having a VAV device therein, said plurality of computers each further being coupled through one of a local area network and a building HVAC computer network to said VAV devices, and said computers being adapted to generate a control signal capable of changing the temperature set point of a selected VAV device for the transmission of said signal to a VAV device located in the same space as said computer so as to enable independent adjustment of the temperature set point of the selected VAV device.

16. The HVAC system as defined in claim 15 wherein, said computers are coupled to said VAV devices through both a local area network and a building HVAC computer network; and said computers are formed to generate a control signal capable of changing the temperature set point only at a VAV device located in the same space.

17. A process for individual adjustment of the temperature set points of a plurality of VAV devices in an HVAC system for a building having a building HAVAC network connected to each of said plurality VAV devices, comprising the steps of:

coupling each of a plurality of computers located in a plurality of spaces in said building for input of a temperature set point signal to said building HVAC computer network, each said VAV device being adapted for, and responsive to, receipt of said signal from said building HVAC computer network to adjust a temperature set point for said VAV device;

inputting a selected computer with a temperature set point for adjustment of the temperature set point of a VAV device located in the same space as said selected computer; and communicating a temperature set point signal encoded to effect adjustment of only a VAV device located in the same space as said selected computer from said selected computer through said building HVAC computer network to the VAV device located in said same space to effect adjustment of the temperature set point for said VAV device independently of other VAV devices in said HVAC system.

18. A process for individual adjustment of the temperature set points of a plurality of VAV devices in an HVAC system for a building comprising the steps of:

coupling each of a plurality of computers located in a plurality of spaces in said building for input of a temperature set point signal to at least one VAV device located for the discharge of air into each of said spaces by electrically connecting said computer to a controller controlling operation of an actuator in said VAV device, each said VAV device being adapted for, and responsive to, receipt of said signal to adjust a temperature set point for said VAV device;

inputting a selected computer with a temperature set point for adjustment of the temperature set point of a VAV device located in the same space as said selected computer; and communicating a temperature set point signal from said selected computer to the VAV device located in said same space to effect adjustment of the temperature set point for said VAV device independently of other VAV devices in said HVAC system.

* * * * *